(12) United States Patent
Brown (10) Patent No.: US 9,783,233 B2
(45) Date of Patent: Oct. 10, 2017

(54) COMPOSITE LAND VEHICLE FRAME

(75) Inventor: Carter Brown, Boulder, CO (US)

(73) Assignee: Boulder Electric Vehicle, Boulder, CO (US)

( * ) Notice: Subject to any disclaimer, the term of this patent is extended or adjusted under 35 U.S.C. 154(b) by 1336 days.

(21) Appl. No.: 12/650,273

(22) Filed: Dec. 30, 2009

(65) Prior Publication Data

US 2011/0095574 A1 Apr. 28, 2011

Related U.S. Application Data

(60) Provisional application No. 61/255,770, filed on Oct. 28, 2009.

(51) Int. Cl.
| | | |
|---|---|---|
| *E04C 3/02* | (2006.01) | |
| *B62D 21/10* | (2006.01) | |
| *B62D 25/20* | (2006.01) | |
| *E04C 2/36* | (2006.01) | |
| *E04C 2/24* | (2006.01) | |
| *B29C 70/08* | (2006.01) | |
| *B29C 70/86* | (2006.01) | |
| *B32B 3/12* | (2006.01) | |
| *B62D 29/04* | (2006.01) | |
| *B29C 65/50* | (2006.01) | |
| *B29C 65/00* | (2006.01) | |

(Continued)

(52) U.S. Cl.
CPC ............ *B62D 21/10* (2013.01); *B29C 70/086* (2013.01); *B29C 70/86* (2013.01); *B32B 3/12* (2013.01); *B62D 25/20* (2013.01); *B62D 29/041* (2013.01); *E04C 2/24* (2013.01); *E04C 2/36* (2013.01); *E04C 3/02* (2013.01); *B29C 65/482* (2013.01); *B29C 65/483* (2013.01); *B29C 65/4815* (2013.01); *B29C 65/5057* (2013.01); *B29C 66/301* (2013.01); *B29C 66/5346* (2013.01); *B29C 66/53462* (2013.01); *B29C 66/727* (2013.01); *B29C 66/7254* (2013.01); *B29C 66/7422* (2013.01); *B29C 66/7444* (2013.01); *B29C 66/7465* (2013.01); *B29C 66/7486* (2013.01); *B29K 2063/00* (2013.01); *B29L 2031/30* (2013.01); *B32B 37/12* (2013.01); *B32B 2037/1276* (2013.01)

(58) Field of Classification Search
CPC ..... E04C 2/24; E04C 2/36; E04C 3/02; B62D 25/20; B62D 21/10
USPC ................ 52/309.1, 309.13, 309.14, 309.15; 296/204
See application file for complete search history.

(56) References Cited

U.S. PATENT DOCUMENTS 4,043,498 A * 8/1977 Conn, Jr. ....................... 228/265
4,095,938 A * 6/1978 Mikaila ......................... 432/225

(Continued)

*Primary Examiner* — Andrew J Triggs
(74) *Attorney, Agent, or Firm* — David S. Kerr; Berg Hill Greenleaf Ruscitti LLP (57) ABSTRACT

A composite frame for vehicles formed with a honeycomb or similar core laminated on the top and bottom sides with a layer of material joined by an adhesive layer. One or more structural beams or stringer are interposed between the top and bottom layer of the composite frame running part or all of the length or width of the composite frame. Each of these structural members may also be joined to the top and bottom material as well as the adjacent honeycomb or by a layer of adhesive or by other means. One embodiment of the frame may be perfectly flat along a horizontal axis. A second embodiment may conform to any curvature, angle or combination specified.

38 Claims, 4 Drawing Sheets

(51) Int. Cl.
     *B29K 63/00*      (2006.01)
     *B29L 31/30*      (2006.01)
     *B32B 37/12*      (2006.01)
     *B29C 65/48*      (2006.01)

(56) References Cited

U.S. PATENT DOCUMENTS

| | | | | |
|---|---|---|---|---|
| 4,416,349 | A * | 11/1983 | Jacobs | 181/208 |
| 4,635,882 | A * | 1/1987 | SenGupta et al. | 244/119 |
| 5,316,872 | A * | 5/1994 | Baer | 429/62 |
| 5,626,382 | A * | 5/1997 | Johnson et al. | 296/146.7 |
| 5,975,237 | A * | 11/1999 | Welch et al. | 181/290 |
| 6,085,485 | A * | 7/2000 | Murdock | 52/783.19 |
| 6,179,943 | B1 * | 1/2001 | Welch et al. | 156/160 |
| 6,401,414 | B1 * | 6/2002 | Steel et al. | 52/309.6 |
| 6,533,031 | B1 * | 3/2003 | Garcia et al. | 165/263 |
| 7,197,852 | B2 * | 4/2007 | Grillos | 52/144 |
| 7,427,093 | B2 | 9/2008 | Watanabe et al. | |
| 7,489,056 | B2 * | 2/2009 | Harada | 310/40 R |
| 7,575,650 | B1 * | 8/2009 | Shah et al. | 156/78 |
| 2002/0162696 | A1 | 11/2002 | Maus et al. | |
| 2009/0162748 | A1 * | 6/2009 | Fan et al. | 429/175 |

* cited by examiner

Fig. 7
REGULAR GRID STRINGER CONFIGURATION

Fig. 8
STRINGERS WITH CIRCULAR MEMBERS THROUGH
WHICH COMPONENTS ARE BOLTED TO THE FRAME

COMPOSITE LAND VEHICLE FRAME

RELATED APPLICATION

The present application relates to and claims the benefit of priority to U.S. Provisional Patent Application No. 61/255,770 filed 28 Oct. 2009, which is hereby incorporated by reference in its entirety for all purposes as if fully set forth herein.

BACKGROUND OF THE INVENTION

Field of the Invention

Embodiments of the present invention relate, in general, to composite vehicle structures and more particularly to the productions and design of a composite vehicle frame having an internal support structure.

Relevant Background

Land vehicles have traditionally been designed to utilize a steel rail frame for support. This frame includes cross-connecting components to add rigidity and strength and it is this frame that serves as the foundation around which the rest of the vehicle is designed. As one skilled in the mechanical arts will appreciate, a substantially parallel rail frame design requires cross members to enhance the structures rigidity and strength. Unfortunately, the cross members also increase the vehicle's air resistance, weight and the cost of manufacture. As is well known to one skilled in the relevant art, most vehicle frames are steel. Steel is not the strongest, cheapest or lightest material. While other materials such as aluminum or titanium could be used to construct a frame, the selection of steel has traditionally been used for its ability to provide a strong platform which can be reliably fabricated and produced at an acceptable weight and reasonable cost. Re-examination of these parameters has generally been of little concern.

While weight versus strength has always been one aspect of land vehicle design, it has held a less important role than with the design of other types of vehicles. Theoretically, an aircraft can be designed to be fabricated entirely from steel just as a ship may be constructed from concrete, however, an all steel aircraft would require a tremendous amount of lift to be produced by the wings. The size of the wings dictated by such a weight would require substantial thrust necessitating larger and more numerous engines, yet again increasing the weight. Thus, for several reasons only a few of which have been elaborated herein, aircraft design strives to produce a strong yet lightweight structure. As suggested, there are other considerations. Corrosion and structural fatigue must be considered as well as rigidity. When all of these factors are balanced, an aluminum structure of equivalent strength, while lighter, is significantly larger than that of steel. Moreover, aluminum is more flexible than steel. Thus, a comparable design in aluminum is constrained by rigidity, not strength.

The solution, with respect to aircraft, was to modify the way in which panels and structures were fashioned. Rather than transferring loads from the surfaces of wings to an internal robust frame, panels were designed to inherently carry and distribute forces such that the internal frame could be minimized. The result was a lightweight, strong and rigid structure that could be carried aloft by the available power sources. However, this solution came at a cost. Even simple aircraft are expensive to design and build, resulting in the cost per mile of delivery of goods by air far exceeding that of land transportation.

Designers of land vehicles are now facing a similar convergence of needs. As fuel becomes scarce, more efficient vehicles are desirable. Environmental concerns have heightened awareness that larger and typically dirtier engines burning more fossil fuels are not the solution. Thus, a trend has existed for several years to make land vehicles lighter, more efficient and powered by alternative fuels and engines. The tasks for which these land vehicles are designed remains essentially the same; that is, land vehicles carry passengers and cargo. Many advances have occurred making the power sources of land vehicles more efficient. Engines operating on fossil fuels have been enhanced to produce the same or more power while utilizing less fuel. Alternative energy sources have been explored including electric and hybrid vehicles. Modifications leading to lighter and stronger frames have lagged in the evolution of land vehicle design. A challenge remains how to design and produce a vehicle frame that is lightweight and strong while being cost effective.

The majority of vehicles today continue to be built around a steel frame. Such a frame is a tradeoff between cost, strength and rigidity. The steel rails in traditional automotive frames must be bent, rolled, cast and custom cut for each new vehicle design. As a result very specific tooling must be designed for each new vehicle. Consequently, there is a monumental cost incurred for changing designs. Thus, the majority of automobile, truck and similar vehicle innovation has focused on lightening upper body components. Little or no attention has been paid to lightening or redesigning the frame of the vehicle. Indeed, many different vehicles possess the same underlying frame. For example, the underlying frame of a Ford F-150 is identical to that of the Ford series SUV's. Similarly, many differing designs of passenger cars are based on the same frame.

The prior art is not without its attempt to use composite structures in automobiles. One such attempt can be found in U.S. Pat. No. 4,573,707 issued to Pabst on Mar. 3, 1986. Pabst discloses a design that attempts to lighten the traditional steel frame using plastic, but falls short of a simplifying design that is easily interchangeable and can be retooled at a minimum cost.

Similarly, an underbody design in U.S. Pat. No. 4,898,419 issued to Kenmochi and Nakamura on Feb. 6, 1990 places honeycomb composite within the passenger floor pan, but does nothing to eliminate the standard automotive frame or change its design to enhance efficiency and ease of manufacturing. Similarly, U.S. Pat. No. 5,849,122 issued to Kenmochi et al. on Dec. 15, 1998 provides for an easier method to incorporate composite sandwich panels into a floor pan but again does not eliminate the need for an exterior frame.

U.S. Pat. No. 4,585,086 issued to Hiramatsu on Apr. 29, 1986 attempts to lighten the frame members using honeycomb composite, but nonetheless maintains the fundamental rail design. The same characteristic approach can be found in the floor panel for a vehicle in U.S. Patent Application Publication 2009/0230729 A1 to Lusk published on Sep. 17, 2009. Here, Lusk specifies a plurality of honeycomb layers that can be used in order to dampen the noise of an interior vehicle compartment. Lusk does not address using such materials in the underlying vehicle frame. Indeed, Lusk specifies that the invention would require an exterior frame adding additional weight and cost to the manufacturing process.

As the ground vehicle industry becomes increasingly more competitive, new applications of materials and structures are sought to lighten vehicles without compromising essential structural integrity. Accordingly, new uses for composites are desirable. A challenge remains for a composite panel design that is both structurally sound to meet strength and rigidity requirements of a land vehicle without having to rely on an external frame. These and other challenges of the prior art are addressed by one or more embodiments of the present invention.

SUMMARY OF THE INVENTION

Described hereafter by way of example is a novel way of constructing a load-bearing structure to serve as a frame for a land-based vehicle. Instead of a traditional frame made from component structural shapes or a structure made from composite panels attached to a traditional rail frame, one or more embodiments of the present invention combine the advantages of structural components and composite structures in a novel way to provide a composite frame which eases manufacturing requirements, provides increased safety attributes, and is lighter and more cost effective than that disclosed in the prior art.

According to one embodiment of the present invention, structural composite panels (and other shapes) are constructed by bonding two "skins" or panels made of carbon-fiber-epoxy, aluminum, fiberglass-epoxy, or similar material to a lightweight separator such as Nomex honeycomb, aluminum honeycomb, foam, or lightweight wood, etc. As one skilled in the relevant art will recognize, various materials may be effectively used to produce a composite vehicle frame described herein. The material selection is based on a variety of factors including weight, strength, durability, ease of manufacture, cost, and rigidity. Each skin or layer is bonded to form the structural composite panel of the present invention by using, according to one embodiment an adhesive. Adhesives such as resin, epoxy resin, and other glues can be used in conjunction with the present invention as can alternative bonding techniques such as ultra-sonic welding, deformation bonding or, plastic flow bonding. Interposed between the panels and positioned alongside the separator material are stringers which act to distribute loads throughout the composite structure as well as increasing structural rigidity.

According to one embodiment of the present invention, a series of reinforcing components (stringers) are interposed between two outer panels with a cross-sectional channel orientation perpendicular to the cavity orientation formed by the internal separator material. The exterior panels are equally bonded to both the skeleton and its surrounding separator material.

According to another embodiment of the present invention components and external structures are attached to the internal skeleton. The internal skeleton bears the loads imposed by these external structures and distributes these loads uniformly to the composite panel. The internal frame members also serve as a means to precisely locate attachment points within the composite panel. The internal skeleton enables external attachment(s) anywhere along the panel. If desired, attachment points along the extent of the internal skeleton can be selected and machined after the panel is fabricated, rather than before the panel is fabricated.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The composite frame for land vehicles according to one embodiment of the present invention combines the strength and lightness of a honeycomb, hexagonal or similar geometric shaped cell structure with the rigidity of the traditional rail frame. By interposing an internal skeleton of longitudinally oriented stringers within the composite layers of the honeycomb structure, the resulting panel possesses both high strength and high rigidity yet maintaining its characteristic light structure. As is known to one skilled in the relevant art, a stringer is generally understood to be a long, horizontal structure used for support or as a connector. In aircraft a stringer is a thin strip of wood, metal or carbon fiber, to which the skin of the aircraft is fastened. For the purposes of the present invention a stringer is a longitudinal member of various cross sections and designs such as a tube, box or z section which is embedded to provide additional support and strengthen the composite frame. Unlike aircraft, the present invention incorporates these longitudinal members so that they are interposed between the upper and lower layers of the composite frame and thereby directly interact with the honeycomb or similar separator material. The combination of the honeycomb and these longitudinal members form a rigid, reinforced core that acts to efficiently distribute structural loads throughout the composite frame.

According to one embodiment of the present invention a separator material such as a honeycomb or similar composite is interposed between two substantially planar surfaces. Positioned alongside the separator material and interspersed between the planar components of the composite frame are one or more longitudinally oriented stringers. These stringers aid in the distribution of forces throughout the composite frame structure as well as increasing the panel's overall rigidity.

Figure 1:
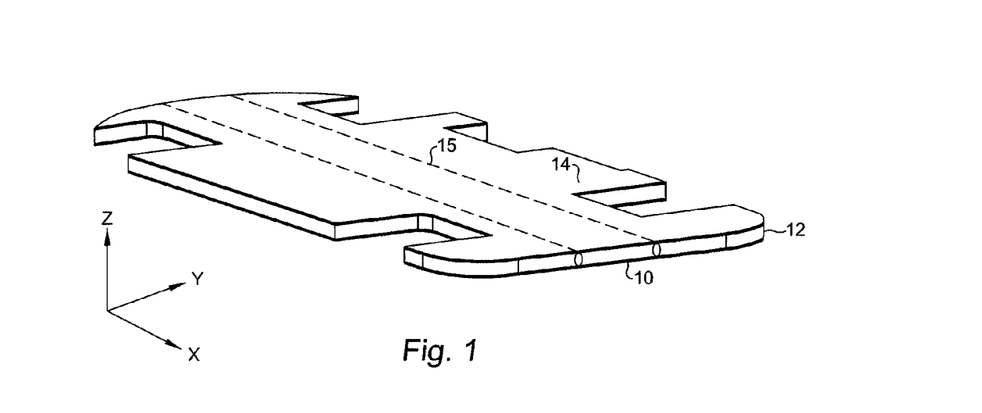
FIG. 1 shows a perspective view of a composite vehicle frame according to one embodiment of the present invention.

FIG. 1 shows a perspective view of a composite frame structure for land vehicles according to one embodiment of the present invention. As can be seen in FIG. 1, an upper panel 14 is bonded to a composite separator material 12 which is interposed between the upper panel 14 and a lower panel 10. Further interposed between the upper panel 14 and the lower panel 10 are, in this example, two stringers 15. In other embodiments of the present invention the composite frame is void of any stringers 15 or internal skeleton members. In a construction void of stringers the composite frame enhances the frame's rigidity through selection of materials comprising the upper panel 14 and lower panel 10, as well as a separator material 12 interposed between.

The separator material 12, also referred to herein as the core material, comprises such material as foam, paper, Nomex, Kevlar, fiberglass, carbon fiber, aluminum honeycomb or other material as it would be apparent to one skilled in the relevant art. According to one embodiment of the present invention, the separator material 12 of the composite frame has a transverse dimension parallel to the z axis ranging from approximately 1-4 inches. In each application, the orientation of the separator material 12 is generally transverse to the plane or orientation of the panels 10, 14. For example, in a case of using a honeycomb material, the walls of the cavities of each honeycomb would be oriented vertically along the Z axis or perpendicularly with respect to the planar surface of panels 10, 14. As can be seen in FIG. 1 the composite frame is substantially planar within the X, Y plane.

Similarly, the panels 10, 14 can be selected from a list of materials such as aluminum, plastic, carbon graphite, carbon fiber and fiberglass. As one skilled in the relevant art will appreciate, other material that possesses similar characteristics of strength and weight can be used in conjunction with the present invention without departing from the present invention's scope. According to one preferred embodiment of the present invention, two aluminum sheets of approximately 0.080 inches are used for both the upper panel 14 and the lower panel 10. In other embodiments the upper layer and lower layer can be comprised of aluminum ranging from 0.002 to 0.0125 inches in thickness with the core material being approximately 0.125 to 12 inches thick. As the loads of the entire frame are distributed throughout its composite construction, the upper and lower panels experience different loading characteristics. Typically, the load vector experienced by the composite frame would be perpendicular to its planar surface. When a substantial load is placed on the composite frame, the load is distributed throughout the two panels and the core material, placing the upper panel in compression, the lower panel in tension, and the core material in a combination of compression, tension and shear. The honeycomb structure of the core material distributes the load variation, however, the upper and lower panel experience distinctly different loading conditions. According to one embodiment of the present invention the selection and design of the upper and lower panels are based on the projected forces and stresses that will be incurred. As will be appreciated by one skilled in the art, the strength of materials described by bulk, shear and Young's moduli varies considerably.

Some material strongly resists compression while showing relative weakness against tension. Similar variance between compressive strength and weakness against shear may be encountered. According to one embodiment of the present invention, material for the lower surface is selected so as to be strong in resisting tension while the upper surface is selected so as to be strong against compression.

The stringers 15 represent an internal skeleton to the composite frame. By interposing the one or more stringers sandwiched between or otherwise within the upper and lower panels 10, 14 of the composite frame, the rigidity of the frame is increased significantly without significant added cost or weight. As one skilled in the relevant art will recognize, the cross-sectional aspect of the stringers may vary depending on the applications and necessary rigidity requirements of the composite frame. For example, the cross section of stringers 15 may be selected from cross sections comprising a C channel cross-section, an I cross section, a Z cross-section or in other embodiments, the stringer could be a box beam. Indeed the stringer could be solid or tubular as well. In each case, the upper and lower portions of each stringer 15 are bonded to the upper and lower skin 10, 14 of the composite frame respectively. The bonding must be of sufficient strength so as to enable loads incurred by one section of the composite frame to be distributed throughout the remaining portions of the composite frame via the stringers. Similarly, the bond between the stringers and upper and lower panels must be sufficient to enable loads attached to the stringers to be distributed throughout the frame. Various bonding materials and techniques are well known in the art are contemplated as being within the scope of the present invention. For example the upper and lower layer of the composite frame can be bonded to the core material using an epoxy adhesive. Other applicable bonding material and techniques include polyester adhesives, water based adhesives, ultrasonic welding, plastic flow bonding or deformation bonding.

According to another embodiment of the present invention, the stringers can be fashioned from the core material using an epoxy (or other adhesive) filler. The walls of the cells in a honeycomb structure are oriented perpendicular to the planar orientation of the upper and lower panels. Similarly, the cells are perpendicular to the longitudinal orientation of the stringers. According to one embodiment of the present invention, after one panel is bonded to the core, select cells of the honeycomb core are filled with epoxy equating the presence of a stringer. The epoxy is then cured to form a structural member or members within the honeycomb core. Thereafter, the second panel is bonded to the core forming a composite frame that possesses a honeycomb core with integral structural stringer components.

Figure 2:
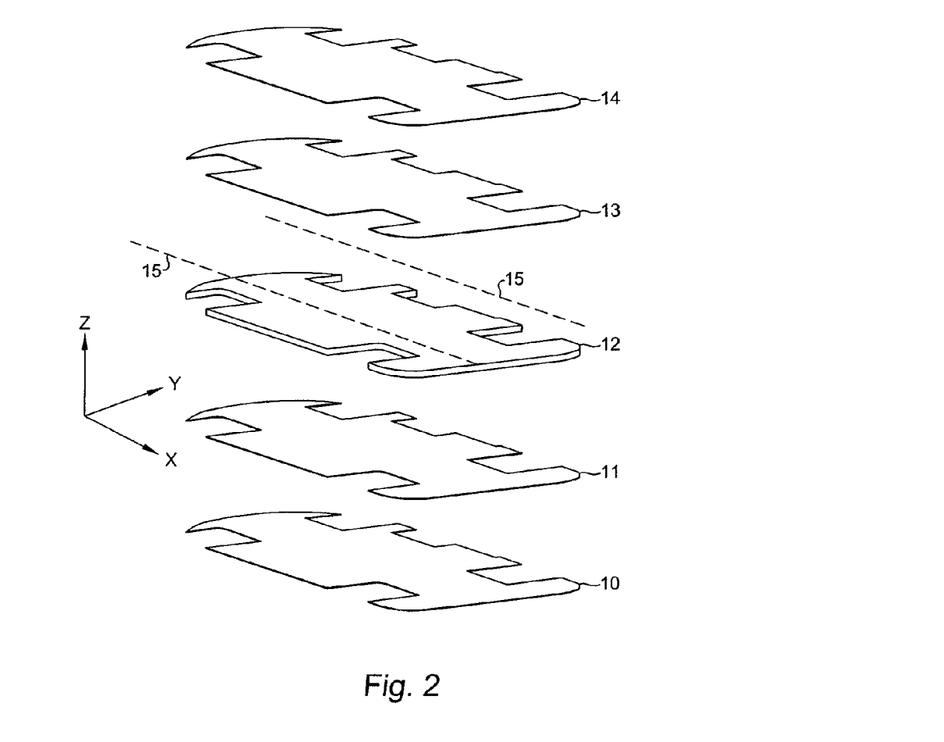
FIG. 2 shows an exploded perspective view of a composite vehicle frame including a plurality of stringers according to one embodiment of the present invention.

FIG. 2 shows a perspective exploded view of the composite frame for land vehicles according to one embodiment of the present invention. As can be seen in FIG. 2, separator material 12 is interposed between an upper panel 14 and a lower panel 10. A bonding material such as adhesive 13, 11 joins the upper panel 14 to separator 12 and the lower panel 10 to separator 12, respectively. As one skilled in the relevant art will recognize various means of bonding or joining the separator material 12 to the upper and lower panels 10, 14 may be used without departing from the scope of the present invention.

FIG. 2 further shows a plurality of stringers 15 oriented longitudinally along the X axis of the composite frame. The orientation shown in FIG. 2 highlights that the internal structure of the stringers 15 may vary according to the application of the present invention. For example, in one embodiment, four longitudinally oriented stringers 15 may be interposed between the upper panel 14 in the lower panel 10 while in another application two longitudinal stringers 15 may be oriented within the separator material 12, including two transversely oriented stringers to strengthen the midsection of the panel. Furthermore, the type of stringers 15 may vary according to the application of the composite frame.

In one embodiment of the present invention, four stringers are longitudinally extended lengthwise along the X axis of the composite frame. The stringers extend from a region at which the front suspension of the vehicle would be attached to the rear portion of the frame encompassing a second portion at which the rear suspension would be affixed. Each of the stringers in this embodiment of the present invention is comprised of ¼ inch wall and 3 inch diameter aluminum tubing. The stringers are laterally spaced within the composite frame so as to flank the attachment points of the forward and rear suspensions. More specifically, a set of stringers run longitudinally on either side of the front and rear leaf springs. In such an embodiment of the present invention, two stringers flank the left fore and aft leaf spring attachment points and two stringers flack the right fore and aft leaf spring attachment points. Thus, while symmetric, the lateral spacing of the stringers is not uniform.

According to another embodiment of the present invention, the stringers which are integrated within the core material can extend beyond the end of composite frame. Rather than restricting the stringers to remain within the confines of the composite frame according to one embodiment of the present invention stringers located strategically throughout the composite frame can be extended to be used for loading or other versatile purposes. The extended stringers can be used for such common things as attachment points for side panels or other accessories to vehicle while in other embodiments of the present invention the stringers can be extended significantly to attach implementation devices to enhance the versatility and functionality of the composite vehicle frame. For example in a military application, stringers supported by the composite frame and made of impact resistant material can be used to support machinery or devices that are extended into high risk areas such as in minesweeping or demolition of unexploded ordinance.

In traditional land vehicles, rail frame construction is used to support major components of the vehicle. For example, the engine block, the fuel tank, and the transmission of traditional vehicles are mounted to and are supported by the rail frame. According to one embodiment of the present invention, these major components of the vehicle are directly mounted to the composite frame thereby eliminating the need for a rail frame construction. In this manner a manufacturer can attach a suspension, axles, wheels and other various components to the underside of the frame while upper body components such as seating, doors, windows, and other various components can be affixed to the upper side of the frame. Upper body components can further have attachment points to the side of the frame as necessary.

According to one embodiment of present invention, the attachment points of major components into the composite frame can be accomplished by either tapping directly into the one or more stringers oriented longitudinally within the composite frame or by bonding an attachment point within the separator material of the frame. For example, if a major component such as the drive train needed to be attached to the composite frame at a position other than the stringer location, a mounting point can be fashioned into the composite frame by drilling into the separator material and replacing the resulting void with the mounting point that extends within the separator material and bonds therein with the adhesive. Once cured, the bonding point becomes an integral part of the composite frame thereby distributing the loads incurred on the mounting point throughout the composite frame. Alternatively if major components are aligned such that stringer hard attachment points are available, a mounting point can be fashioned directly onto the stringer which will thereby transmit forces and loads incurred on a mounting point throughout the composite frame. In another embodiment of the present invention, should the mounting point of various components be known prior to construction, mounting points can be fashioned into the composite frame panels or the stringers during construction thereby reducing cost and enhancing versatility of the composite frame.

According to another embodiment of the present invention, the composite frame can be manufactured to include various shapes and orientations. Curved structures and panels can be inherently added to the frame without detrimentally affecting the load carrying capacity of a composite frame. Indeed the entire frame can be fashioned to incorporate curvilinear or rounded shapes that would inherently increase the rigidity of the composite frame. In such a curved design rigidity of the composite frame can be enhanced by virtue of the shape and contours of the upper and lower panels. Depending on the final design, strategically placed contours may not only be aesthetically pleasing but also serve to increase the rigidity of the panel. As one of the primary roles for the stringers is to increase a planar composite frame's rigidity, adding curvilinear surfaces to the composite frame can decrease the necessity for the incorporation of internal stringers or at least decrease the number of stringers included within the frame.

Figure 3:
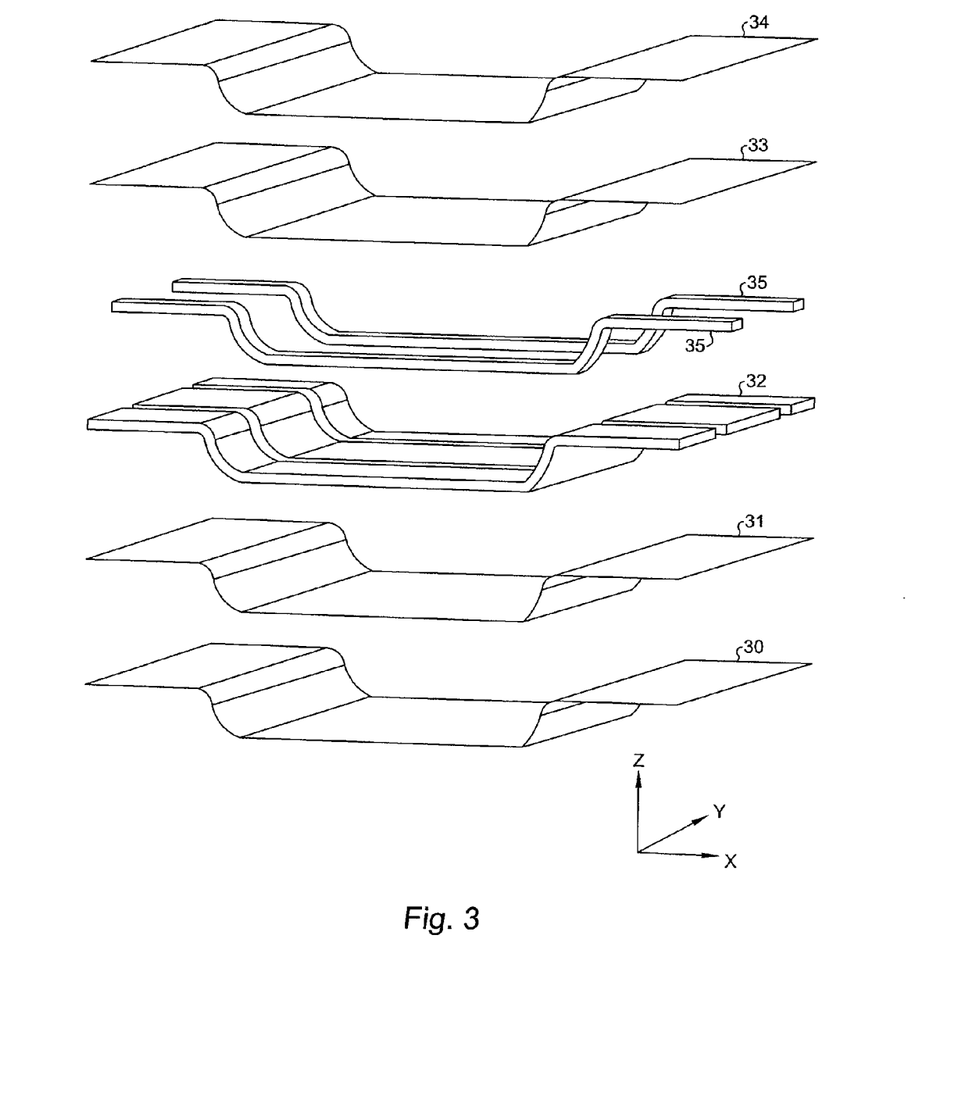
FIG. 3 is an exploded view of a composite frame according to one embodiment of the present invention having a plurality of curvilinear surfaces including a plurality of stringers.

FIG. 3 shows a composite frame according to one embodiment of the present invention having a plurality of curvilinear surfaces. As with a planar composite frame, an upper 34 and lower 30 panel are bonded using an adhesive material 31, 33 to a core material 32 comprised of a integral combination of separator material (honeycomb) and one or more longitudinal strengthening members (stringers) 35. Unlike a planar construction the stringers can be shorter and positioned in locations in which enhanced strength and rigidity are required. By reducing the number of stringers the overall weight of the composite frame is reduced while maintaining its strength and versatility.

According to another embodiment of the present invention the width of the composite material can vary throughout the composite frame. Utilizing curvilinear construction the tendency for the upper and lower panels to be uniformly spaced and in parallel with each other can be relaxed. Based on the expected structural loads to be carried by the composite frame, the width of the core material between the upper and lower panels can be varied. In regions in which an increased load is expected, the width can be increased and in regions in which strength or rigidity is not required the width between the upper and lower panel can be decreased. This variance and the width of the core material in combination with the addition of stringers can provide a versatile, lightweight and cost effective composite vehicle frame.

Elimination of an exterior frame to support major components of the land vehicle provides numerous benefits beyond decreased weight and cost. An additional benefit of a composite frame construction is realized by the application of alternative energy sources and vehicles. Electric and hybrid vehicles utilize a substantial reserve of power held within a battery bank. Such a battery bank is both heavy and vulnerable to damage from collision. Much like the gasoline tank of most vehicles, a bank of batteries must be shielded from impact or damage as a result of a collision or vehicular accident.

The majority of vehicles utilize 12 or 24 volt electrochemical batteries to store relatively large amounts of electrical energy. Electric vehicles and hybrid electric vehicles need to store much larger voltages and quantities of electrical energy. Often the amount of electrical energy that can be stored on such a vehicle is limited as a result of limited space on the vehicle where batteries can be safely stored. The electrical energy stored in the batteries of an electric or hybrid electric vehicle is utilized to provide a "power reserve" at times when the desired rate of travel of the vehicle requires more power than what is being generated by any electrical generators of the vehicle. Thus, the quantity of energy stored in the batteries is the biggest determinant of how far and how fast the vehicle can be driven before it must be slowed to allow onboard generators to recharge the batteries or stopped so that external devices can be used to recharge the batteries. Limited driving distances of electric vehicles, as a result of limited amounts of electrical energy that can be stored in the batteries of the vehicles, have made electric vehicles seem less convenient to many people than more traditional vehicles. One approach to resolve this limitation is to place within the vehicle additional batteries. However, in conventional vehicle designs, space to accommodate additional batteries is limited.

In the event that a vehicle is involved in a traffic accident, any batteries that are mounted to the vehicle could interact with people and the environment in undesirable ways, as a result of the traffic accident. This is especially true for any batteries mounted outside of the typical vehicle frame. Damage to the vehicle caused by the traffic accident can cause the electrical connections of the battery(s) to become short-circuited. When the electrical connections of the battery(s) are short-circuited, heating of electrically conductive components of the vehicle and/or sparking may occur, either of which may, in turn, cause fires and/or explosions. It is also possible that the casing(s) of the battery(s) may be damaged and may, therefore, allow chemicals that are generally considered harmful to the environment and living beings to spill from the battery(s). To reduce the likelihood of battery damage due to a collision, battery banks found in electric and hybrid vehicles reside within the major structural components of the frame. Recall that a typical vehicle frame forms a rudimentary rectangle. For safely concerns the batteries are positioned in the interior portions of this rectangle. Unfortunately this space is limited resulting in a smaller battery/power reserve for the vehicle.

Figure 4:
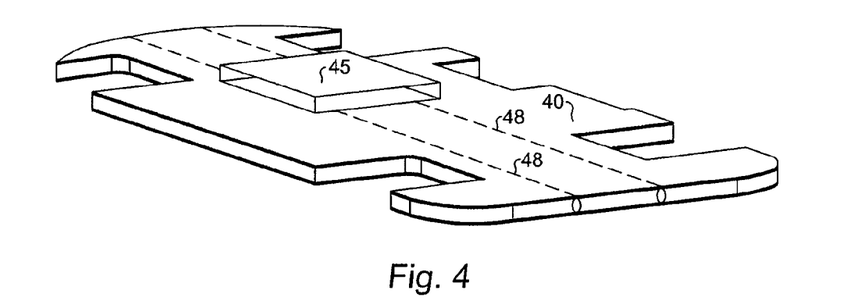
FIG. 4 shows a perspective view of a composite vehicle frame having a plurality of stringers and an independently positioned battery compartment.

The composite frame of the present invention enables a battery pack to be positioned independent of an external supporting frame. FIG. 4 shows the underside of a planar composite vehicle frame 40 of the present invention with a structure 45 positioned on the frame independent of the location of any external or internal supports 48. Note that there are no external supporting members associated with the planar composite vehicle frame 40 of the present invention. As shown, a structure such as a battery pack can be positioned independent of an external frame as well as independent of any internal supporting structures such as stringers 48. The weight incurred by the vehicle due to the battery bank is distributed throughout the composite frame. Moreover, additional composite material can be positioned to surround the batteries for added protection. By placing the batteries independent of a frame necessitated by a traditional vehicle design, a more efficient and safer application of electrically powered transportation can be implemented.

According to one embodiment of the present invention a battery mounting containment unit is integrated within the composite vehicle frame 40 so as to enhance battery reliability and safety in case of a collision. The structure is constructed such that there is a relatively small risk that the batteries mounted within will interact in an undesirable manner with people or the environment in the event that the vehicle is involved in a traffic accident. In one embodiment of the present invention the battery mounting unit of the present invention is constructed from the same material as the composite vehicle frame so as to absorb large amounts of energy and if necessary deform in predetermined ways so as to dissipate large amounts of energy when the battery mounting unit is subjected to forces and accelerations greater than those experienced during normal vehicle operation. Because the battery mounting unit of the present invention deforms in predetermined directions when the vehicle is involved in traffic accidents the mounting of the batteries to the vehicle is maintained and the batteries remain relatively undamaged in all but the most severe traffic accidents. The battery mounting unit of the present invention is carefully designed such that the strength of certain portions of the battery mounting unit varies. This proportioning of the strengths of various portions of the battery mounting unit to one another causes the battery mounting assembly to deform in predetermined directions when the battery mounting assembly is subjected to forces and accelerations experienced in a collision or accident. The battery mounting unit is also preferably constructed in a manner such that there is a relatively small risk of electrically conductive components contacting the electrical connections of the batteries as a result of deformations and motions of the vehicle as a result of the vehicle's involvement in a traffic accident. This reduces the risk that the electrical connections of the batteries will be short-circuited as a result of the vehicle's involvement in a traffic accident.

The entire battery mounting unit can interface with an existing composite vehicle frame or be an integral portion of a composite vehicle frame. As the composite vehicle frame is void of any external supporting structure, the battery mounting unit can be placed at locations which are normally inaccessible due to external frame restrictions. Moreover the battery mounting unit can be positioned to minimize damage due to a traffic-accident and minimize battery/passenger interaction.

Figure 5:
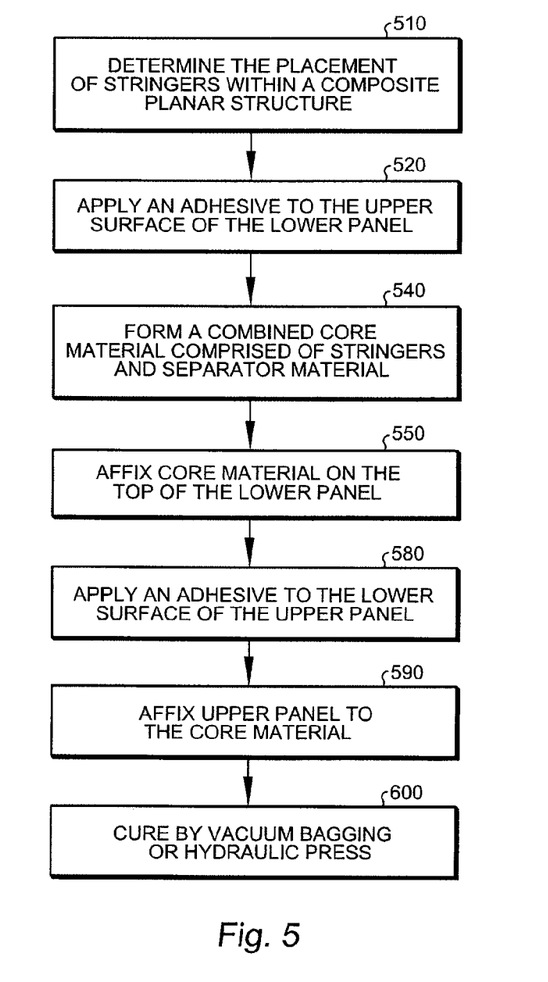
FIG. 5 is a flow chart of one method for manufacturing a composite vehicle frame according to one embodiment of the present invention

FIG. 5 is a flow chart of one method embodiment for manufacturing a composite vehicle frame according to the present invention. The blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware systems that perform the specified functions or steps, or combinations of special purpose hardware.

According to one embodiment of the present invention a stringer and separator design is selected based on the needs of the vehicle. For example, the loading requirements for a small passenger vehicle will likely differ from that of a larger transport or cargo van. The versatility of the present invention enables a composite frame to be constructed for each type of vehicle. Based on the required carrying capacity and required rigidity, a separator/stringer design can be crafted. The orientation and selection of the stringer(s) as well as the thickness and selection of the separator material must be within industry standards for composite construction. The upper and lower surfaces of the stringers and the separator material should be consistent to promote uniform bonding between the upper/lower panels and the material interposed between.

With the orientation of the stringers selected 510, the lower panel can be prepared with adhesive 520 and the core material can be assembled 540. Shortly thereafter the core material including the stringers can be affixed 550 to the upper surface of the lower panel.

In like fashion an adhesive can be applied 580 to the lower surface of the upper panel. Thereafter, the upper panel can be affixed 590 to the lower surface of the combined composite thus laminating the separator and stringers between the two panels. In other embodiments, the application of the upper and lower adhesive material can be done simultaneously. After application of the adhesive, a curing procedure 600 is undertaken to ensure the bonds between the separator material and stringers to the respective panels are secure. Such curing can be done either by vacuum bagging or hydraulic press.

The present invention provides a composite frame for land vehicles void of any external rail system. Unlike conventional land vehicles the present invention eliminates the need for a traditional rail frame construction. Embodiments of the present invention interpose a composite separator material such as a honeycomb or the like in between two panels or skins. The core material is supplemented by one or more stringers which run within the separator material. The stringers enhance the ability of the frame to distribute any point loads throughout the structure and aid in providing needed rigidity for vehicle applications.

Figure 6:
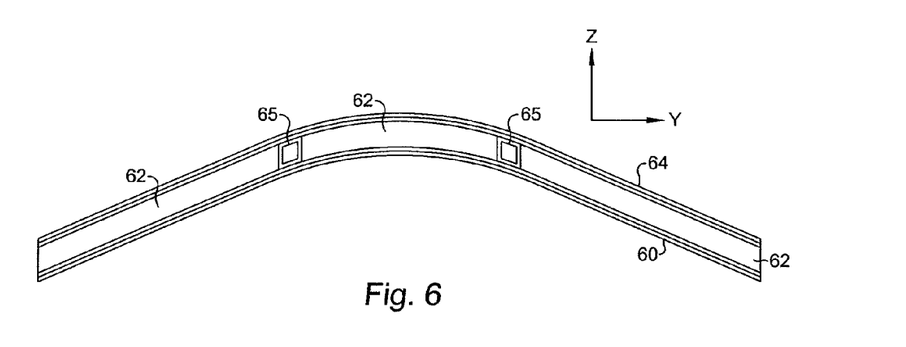
FIG. 6 is a side view of a curvilinear composite frame with internal stringers according to one embodiment of the present invention.

FIG. 6 is a curvilinear cross section of a composite land vehicle according to one embodiment of the present invention. As previously shown with respect to FIG. 3, portions of the composite land vehicle frame can be curved. In the example shown in FIG. 6 a curved portion of the composite land vehicle frame incorporates one or more stringers. As shown in FIG. 6 an upper curved panel 64 is combined with a lower curved panel 60 with a separator material 62 interposed. While the present depiction shows the upper panel 64 parallel with the lower panel 60 one skilled in the art will recognize that the separation between the two panels 64, 60 may vary as required by design considerations. Indeed the variance of thickness may be decided upon by the ability to support various static and dynamic loads. In addition the curved structure provides additional rigidity. That rigidity is supplemented by the stringers 65 which are, in this embodiment, integrated within the separator material 62. Note that in this embodiment of the present invention polygonal cross sectional stringers are used maximizing the rigidity increase in the z axis while conforming with the curved shape.

Figure 7:
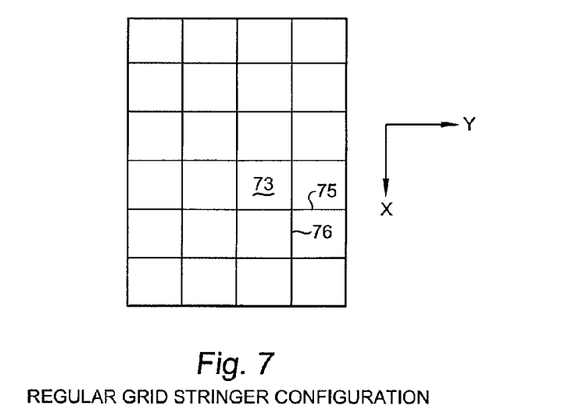
FIG. 7 is a top view of a composite frame showing a rectangular grid of support members according to one embodiment of the present invention.

FIG. 7 is a top view of a grid stringer layout of a composite vehicle frame. In this embodiment of the present invention a cross structure or grid of reinforcing members are interposed between the upper and lower panels of the composite frame. Here a plurality of horizontal stringers 75 orientated along the y axis are combined with a plurality of vertical stringers orientated along the x axis. Each region 73 framed by the horizontal 75 and vertical 76 stringer comprises separator material as is described herein. One of skill in the relevant art will recognize that a variety of stringer configurations are possible and contemplated by the present invention. These designs may be driven by numerous design criteria including projected loads, dynamic and states stress, fatigue, creep, and other factors known to one skilled in the relevant art.

Figure 8:
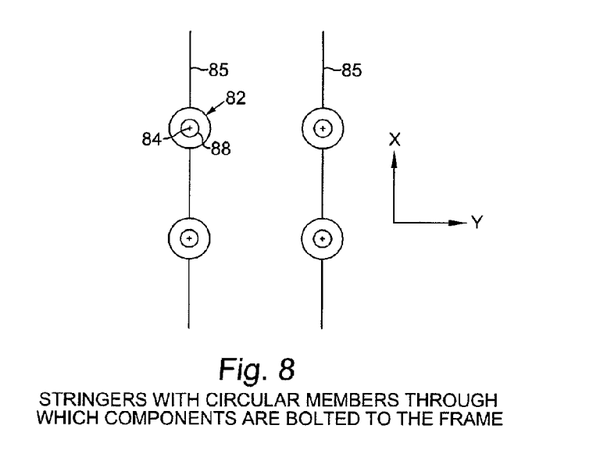
FIG. 8 is a top view of two longitudinally orientated stringers combined with circular support components through which external components can be attached to the composite frame, according to one embodiment of the present invention.

Such design considerations include the location of external connection points to the composite vehicle frame. FIG. 8 shows a top view of a proposed dual stringer configuration with 4 reinforced attachment points. Each longitudinally orientated stringer 85 includes two attachment points having concentric reinforcement members, 82, 88. An inner ring 88 surrounds an attachment point 84 which is further supplemented by an outer ring 82. As loads are placed on the attachment point, stress is conveyed through the inner ring 88, the outer ring 82 and longitudinal stringer 85 to the composite frame. The increase surface area of the rings enables the attachment points to invoke a larger area of the composite frame by which to support a larger load. The concentric circular design provides longitudinal and lateral support (x and y axis support) also acts to resist plastic deformation of the composite frame due to shifting or dynamic loads.

The composite land vehicle frame of the present invention incorporates a layered composite design eliminating the traditional vehicle frame. With the external frame eliminated the composite frame of the present invention enables vehicles to be designed to meet current demands of using alternative energy sources efficiently and to house those power sources safely.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

I claim:

1. A composite vehicle frame, comprising:
    an upper layer of a first material;
    a lower layer of a second material;
    a core material interposed between the upper layer and the lower layer having a core thickness wherein the core material is joined to the upper layer and lower layer by a connecting means;
    at least one stringer interposed between the upper layer and the lower layer wherein the at least one stringer is joined to the upper layer and lower layer by a connecting means and wherein the at least one stringer is operative to distribute structural loads throughout the composite vehicle frame and
    whereby suspension components may be affixed to said lower layer of said composite vehicle frame and upper body components may be affixed to said upper layer of said composite vehicle frame.

2. The composite vehicle frame of claim 1 wherein the upper layer and lower layer are aluminum and are 0.002 to 0.0125 inches in thickness with the core material being approximately 0.125 to 12 inches thick.

3. The composite vehicle frame of claim 1 wherein the first material and the second material comprise different material.

4. The composite vehicle frame of claim 1 wherein the first material is selected from a group of materials consisting of aluminum, plastic, carbon graphite, carbon fiber and fiberglass.

5. The composite vehicle frame of claim 1 wherein the second material is selected from a group of material consisting of aluminum, plastic, carbon graphite, carbon fiber and fiberglass.

6. The composite vehicle frame of claim 1 wherein the connecting means includes using an adhesive.

7. The composite vehicle frame of claim 6 wherein the adhesive is an epoxy base.

8. The composite vehicle frame of claim 6 wherein the adhesive is a polyester base.

9. The composite vehicle frame of claim 6 wherein the adhesive is a water base.

10. The composite vehicle frame of claim 1 wherein the connecting means includes deformation bonding.

11. The composite vehicle frame of claim 1 wherein the connecting means includes plastic flow bonding.

12. The composite vehicle frame of claim 1 wherein the core material is a cellular structure having a plurality of geometric shaped cells.

13. The composite vehicle frame of claim 12 wherein the at least one stringer comprises a plurality of selected honeycomb cells filled with cured epoxy.

14. The composite vehicle frame of claim 1 wherein the core material is a foam structure.

15. The composite vehicle frame of claim 1 wherein the upper layer and the lower layer are void of hard attachment points.

16. The composite vehicle frame of claim 1 wherein the upper layer and the lower layer are substantially planar.

17. The composite vehicle frame of claim 1 wherein separation distance between the upper layer and the lower layer varies.

18. The composite vehicle frame of claim 1 wherein the upper layer and lower layer are each unique and each include at least one curvilinear portion.

19. The composite vehicle frame of claim 1 further comprising a region associated with an exterior surface of the upper layer wherein the region is located on the upper layer and is operable to support a plurality of batteries and wherein the at least one stringer and the region are positioned independent from one another.

20. The composite vehicle frame of claim 1 wherein a central region is operable to support a plurality of batteries on an exterior surface of the upper layer and wherein the plurality of batteries are positioned independent of the at least one stringer.

21. The composite vehicle frame of claim 1 wherein a battery assembly unit is integrated into the composite vehicle frame and located at substantially the innermost region of the composite vehicle frame.

22. The composite vehicle frame of claim 1 further comprising a battery assembly unit forming an enclosed region operable to house a plurality of batteries wherein the battery assembly unit is positioned substantially equally distant from exterior edges of the composite vehicle frame.

23. The composite vehicle frame of claim 22 wherein the battery assembly unit includes forced air circulation operable to maintain a consistent interior temperature of the battery assembly unit.

24. The composite vehicle frame of claim 1 wherein the at least one stringer is characterized as a substantially longitudinal member having a cross sectional width substantially equal to the core material proximate to the at least one stringer.

25. The composite vehicle frame of claim 24 wherein the at least one stringer is a box beam.

26. The composite vehicle frame of claim 24 wherein the at least one stringer is tubular.

27. The composite vehicle frame of claim 1 wherein the at least one stringer includes concentric reinforcement members.

28. The composite vehicle frame of claim 27 wherein said circular orientated grid components are placed within the composite vehicle frame to align with attachment points on the frame used to affix vehicular components to the composite vehicle frame.

29. A method of forming a composite vehicle frame comprising:
providing a honeycomb core having a plurality of cells;
attaching a lower outer sheet to the honeycomb core;
providing at least one stringer within the honeycomb core;
attaching an upper outer sheet to the honeycomb core
providing for affixing suspension components to said lower outer sheet of said honeycomb core; and
providing for affixing upper body components to said upper outer sheet of said honeycomb core.

30. The method of claim 29 wherein the lower and upper sheet are dissimilar material.

31. The method of claim 29 wherein the lower and upper sheet are planar.

32. The method of claim 29 wherein the lower and upper sheet include curvilinear shapes.

33. The method of claim 29 further comprising
providing expandable epoxy;
placing the expandable epoxy within selected cells of the honeycomb core to form the at least one stringer within the composite vehicle frame; and
curing the expandable epoxy so as to expand within the selected cells and to harden the expandable epoxy within the selected cells.

34. The method of claim 29 further comprising a central region on the upper sheet operable to support a plurality of batteries independent of the at least one stringer.

35. The method of claim 29 further comprising forming a battery containment unit as part of the composite vehicle frame positioned substantially equidistant from edges of the composite vehicle frame wherein the battery assembly unit includes an interior space operable to house a plurality of batteries.

36. The method of claim 35 wherein the battery containment unit includes a wall and top formed from the composite vehicle frame and are coated with a fire retardant material.

37. A composite vehicle frame, comprising:
a core material interposed between an upper layer and a lower layer, each layer having a thickness of 0.0024 to 0.125 inches, wherein the core material is joined to the upper layer and lower layer by a connecting means and wherein the core material is a cellular structure having a plurality of geometric shaped cells and whereby suspension components may be affixed to said lower layer of said composite vehicle frame and upper body components may be affixed to said upper layer of said composite vehicle frame.

38. The composite vehicle frame of claim 37 further comprising a region operable to support a plurality of batteries independent of an external frame.

* * * * *